US008272804B2

(12) United States Patent
Hsu Huang et al.

(10) Patent No.: US 8,272,804 B2
(45) Date of Patent: Sep. 25, 2012

(54) CONNECTING STRUCTURE

(75) Inventors: Yueh-Hua Hsu Huang, Taipei Hsien (TW); Lien-Huang Yang, Taipei Hsien (TW)

(73) Assignee: Jazz Hipster Corporation, Taipei Hsien (TW)

( * ) Notice: Subject to any disclaimer, the term of this patent is extended or adjusted under 35 U.S.C. 154(b) by 88 days.

(21) Appl. No.: 12/910,988

(22) Filed: Oct. 25, 2010

(65) Prior Publication Data

US 2012/0042484 A1 Feb. 23, 2012

(30) Foreign Application Priority Data

Aug. 19, 2010 (TW) ............................... 99215908 U

(51) Int. Cl.
*F16B 21/02* (2006.01)

(52) U.S. Cl. ......................... 403/348; 403/349; 181/199

(58) Field of Classification Search .................. 403/348, 403/349, 353; 181/199; 381/335
See application file for complete search history.

(56) References Cited

U.S. PATENT DOCUMENTS 4,305,180 A * 12/1981 Schwartz ...................... 439/296
4,852,178 A * 7/1989 Inkman et al. ................ 381/395
5,699,438 A * 12/1997 Smith et al. .................. 381/386
5,852,545 A * 12/1998 Pan-Ratzlaff ............ 361/679.23
6,318,683 B1 * 11/2001 Savoy .......................... 248/146
6,834,838 B2 * 12/2004 Dennis et al. ............. 248/311.2
2005/0079011 A1 * 4/2005 Groff et al. ................... 403/348
2011/0305498 A1 * 12/2011 De La Rosa ................. 401/195

FOREIGN PATENT DOCUMENTS

EP 400597 A2 * 12/1990
EP 1863318 A1 * 12/2007
NL 1003119 C2 * 11/1997

* cited by examiner

*Primary Examiner* — Victor MacArthur
(74) *Attorney, Agent, or Firm* — Ming Chow; Sinorica, LLC

(57) ABSTRACT

A connecting structure adapted to connect two sound boxes comprises a clasping assembly and a positioning structure, the surface of the clasping assembly has a protruding portion, which has several protruding members, the surface of the positioning assembly has a hollow open, which has several oblique-rotation positioning portions and several apertures according to the protruding members of the clasping assembly, wherein the clasping assembly and the positioning assembly have four locking holes respectively for the clasping assembly and the positioning assembly being fixed to the two sound boxes; the protruding members of the protruding portion of the clasping assembly are inserted into the apertures of the hollow open of the positioning assembly accordingly, the clasping assembly or the positioning assembly is rotated in order to let the protruding members be fixed in the positioning portions, so that the different sound boxes are connected to each other.

1 Claim, 7 Drawing Sheets

CONNECTING STRUCTURE

BACKGROUND OF THE INVENTION

1. Field of the Invention

The present invention generally relates to a connecting structure, more particularly to a connecting structure that is applied to different sound boxes with different lengths so as to form an assembled sound box that is convenient for assembling and dismantling.

2. Description of the Prior Art

With the popularity of large-sized LCD TVs and the feature of the LCD TV being hung on a wall, audio manufacturers gradually produce a type of sound box, called Sound Bar, which is thinner than prior arts and applied to such large-sized LCD TVs. The front speakers of the Sound Bar are disposed on a same level.

Thereby, to develop a is an issue for the skilled persons in the art and may be discussed hereinafter. The distributions of the sound of a single Sound Bar is horizontal, hence it is consistent with the screen of a large-sized LCD TV. Thus, compared with the speakers of a general LCD TV, which are disposed on the two sides of the general LCD TV, the single Sound Bar has a better performance.

With reference to FIG. 1, which illustrates a schematic structural view of a prior Sound Bar. Generally speaking, Sound Bar 1 is specially designed for an LCD TV 2 and greatly promotes the sound performance of the LCD TV 2. Thus, the widths of the Sound Bars are designed to fit with LCD TVs with the sizes of 37 to 50 inches. Most of the Sound Bar are manufactured for some certain dimensions of LCD TVs and as accessories of LCD TVs. Hence, if the LCD TV 2 is larger, then it may need a loner Sound Bar 1 to achieve a better performance and a surround sound effect. Since the horizontal length of the Sound Bar 1 is long enough, the left, middle and right speakers of the Sound Bar 1 is able to cooperate to each other for a better effect, further, the Sound Bar 1 is wide enough to localize sound from left to right.

As aforesaid, the dimensions of the Sound Bar 1 must be fit in with the LCD TV 2 so as to achieve a better effect. On the other hand, to meet with such conditions, a plurality of dimensions of the Sound Bars 1 must be ready, and it does bother audio manufacturers. Frankly speaking, the problems of mass-production and transportations of the large-sized products are caused. Additionally, if a new LCD TV with different dimensions is bought to replace an old one, the dimensions of an old Sound Bar may not be conformed to the new LCD TV; further more, the visual and sound performance may not be good even the hardware cannot be combined together.

Therefore, a connecting structure must be provided to connect sound boxes with different lengths in order to randomly let the connected sound boxes with different lengths be collocated LCD TVs with different dimensions. That is, sound boxes can be assembled as a product with a certain length to meet with any size of an LCD TV. It is the best solution up to now.

SUMMARY OF THE INVENTION

The main objective of the present invention is to provide a connecting structure. The connecting structure is a set of cooperated connecting structure and applied to two sound boxes in order to make different lengths of the sound boxes be assembled to a suitable length, so that LCD TVs with different dimensions can be applied.

The second objective of the present invention is to provide the connecting structure. The connecting structure is a rotational and buckling structure in order to that of fast assembly and dismantling for forming an assembled sound box.

To approach above objectives of the present invention, the connecting structure is disposed between two sound boxes, and the connecting structure comprises a clasping assembly and a positioning structure, the surface of the clasping assembly has a protruding portion, the outer rim of the protruding portion has a plurality of protruding members, the surface of the positioning assembly has a hollow open, the inner rim of the hollow open has a plurality of oblique-rotation positioning portions and a plurality of apertures according to the protruding members of the clasping assembly, wherein the edges of the other surfaces of the clasping assembly and the positioning assembly have four locking holes respectively for the clasping assembly and the positioning assembly being fixed to the two sound boxes; further, the protruding members of the protruding portion of the clasping assembly are inserted into the apertures of the hollow open of the positioning assembly accordingly, the clasping assembly or the positioning assembly is rotated in order to let the protruding members be fixed in the positioning portions, so that the different sound boxes are connected to each other.

Preferably, each of the two ends of the two sound boxes has four concave holes, and the clasping assembly and the positioning assembly can be fixed onto the two ends of the sound boxes by way of penetrating each set of the four locking components through the locking holes of the clasping assembly or the positioning assembly and fixing each set of the four locking components in the four concave holes of the sound box or the other sound box.

Preferably, each sound box accommodates a plurality of loudspeaker monomers.

Other and further features, advantages, and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE INVENTION

Following preferred embodiments and figures will be described in detail so as to achieve aforesaid objects.

Figure 1:
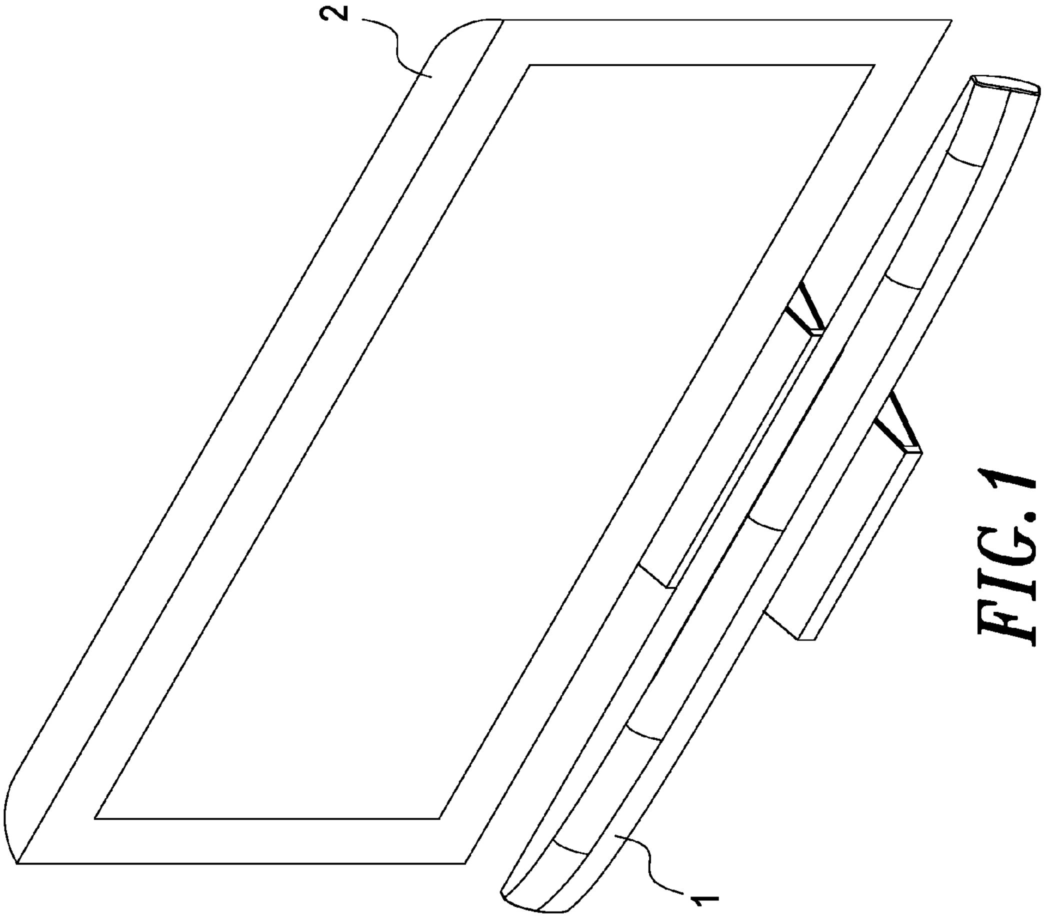
FIG. 1 illustrates a schematic structural view of a prior Sound Bar.
Figure 2:
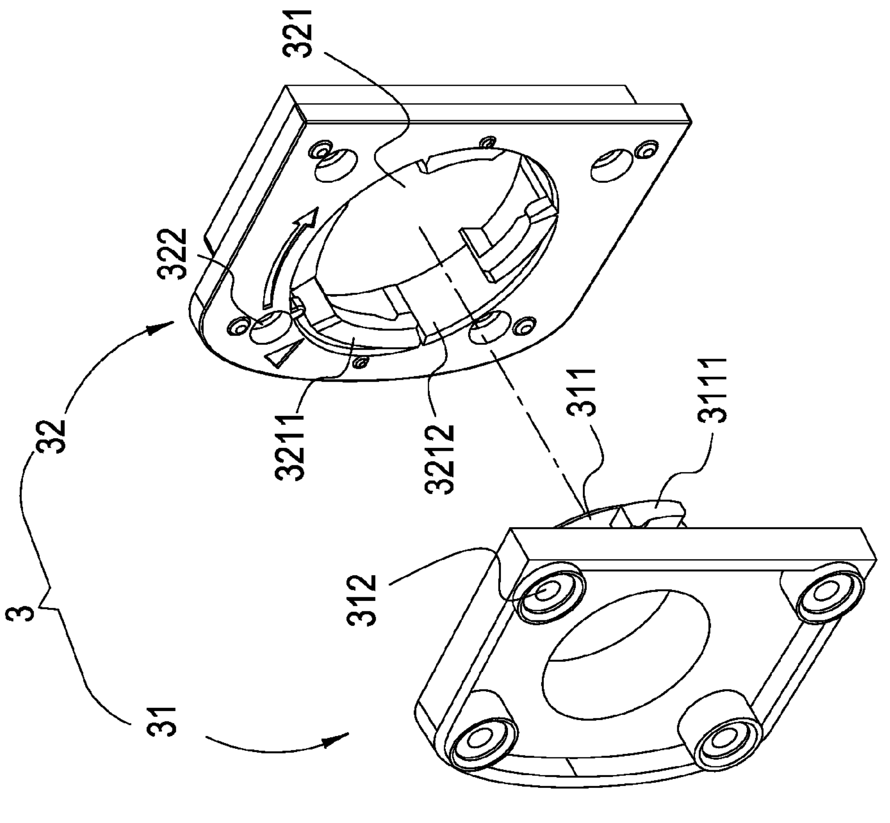
FIG. 2 illustrates a schematic structural view of the connecting structure of the present invention.
Figure 3:
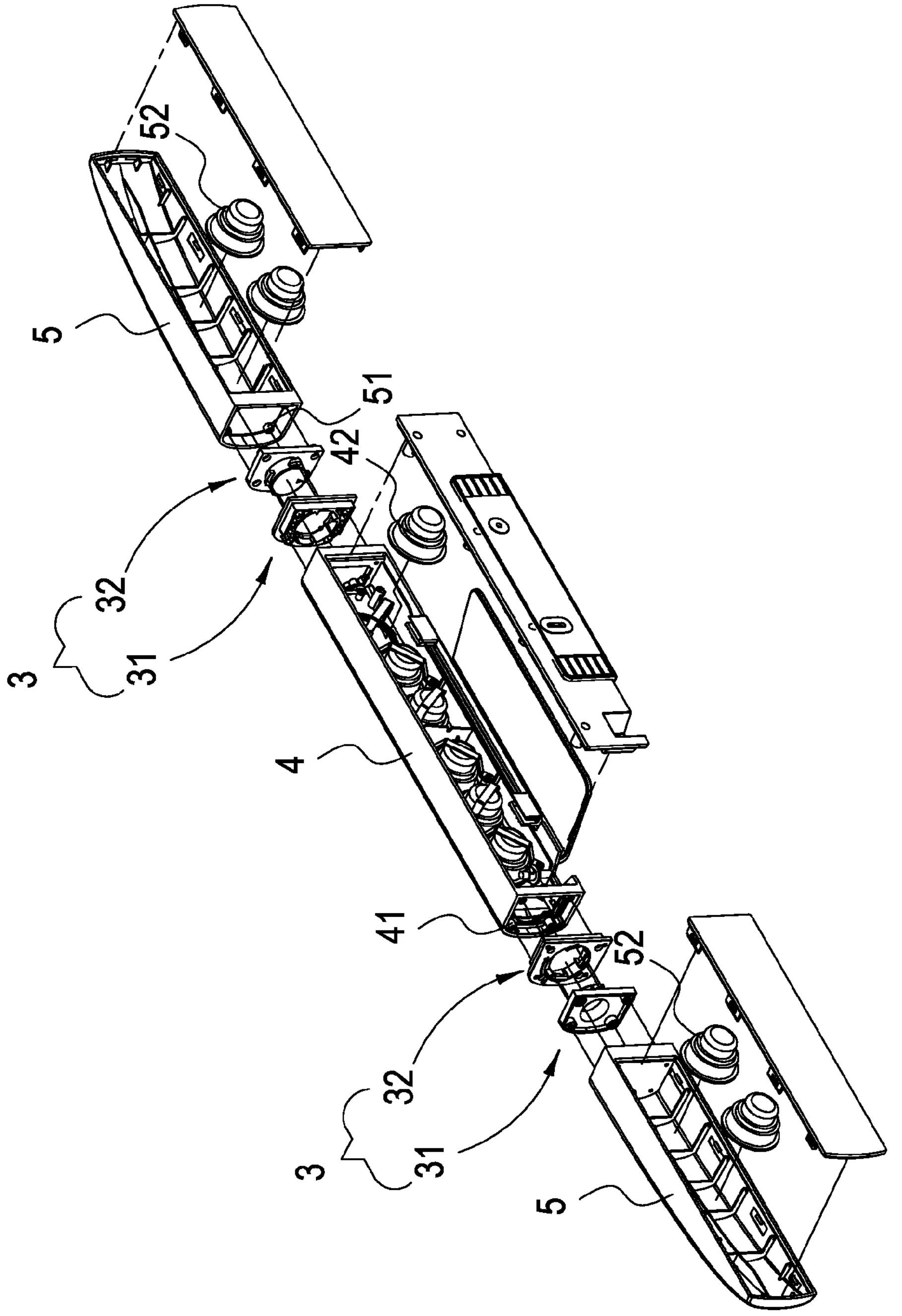
FIG. 3 illustrates a schematic application view of the connecting structure of the present invention.
Figure 4:
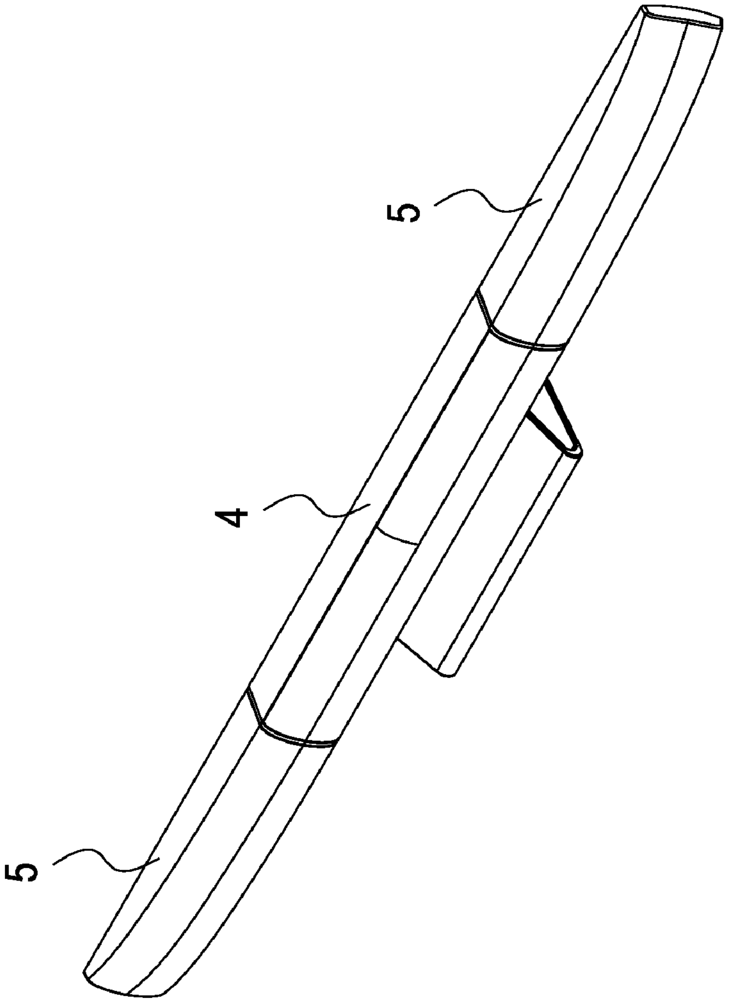
FIG. 4 illustrates a schematic assembly view of the connecting structure and the sound boxes of the present invention.
Figure 5A:
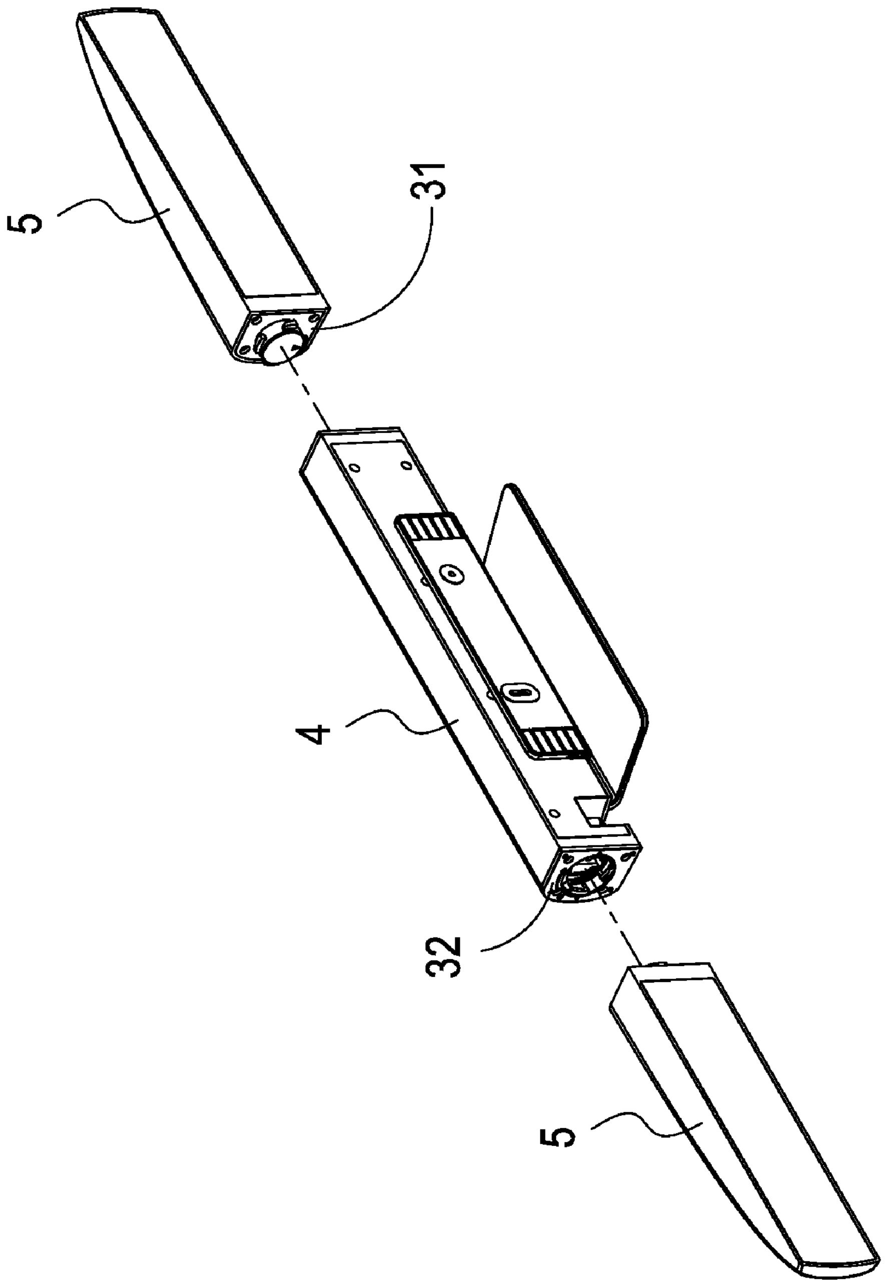
FIG. 5A illustrates a schematic exploded view of the connecting structure and the sound boxes of the present invention.
Figure 5B:
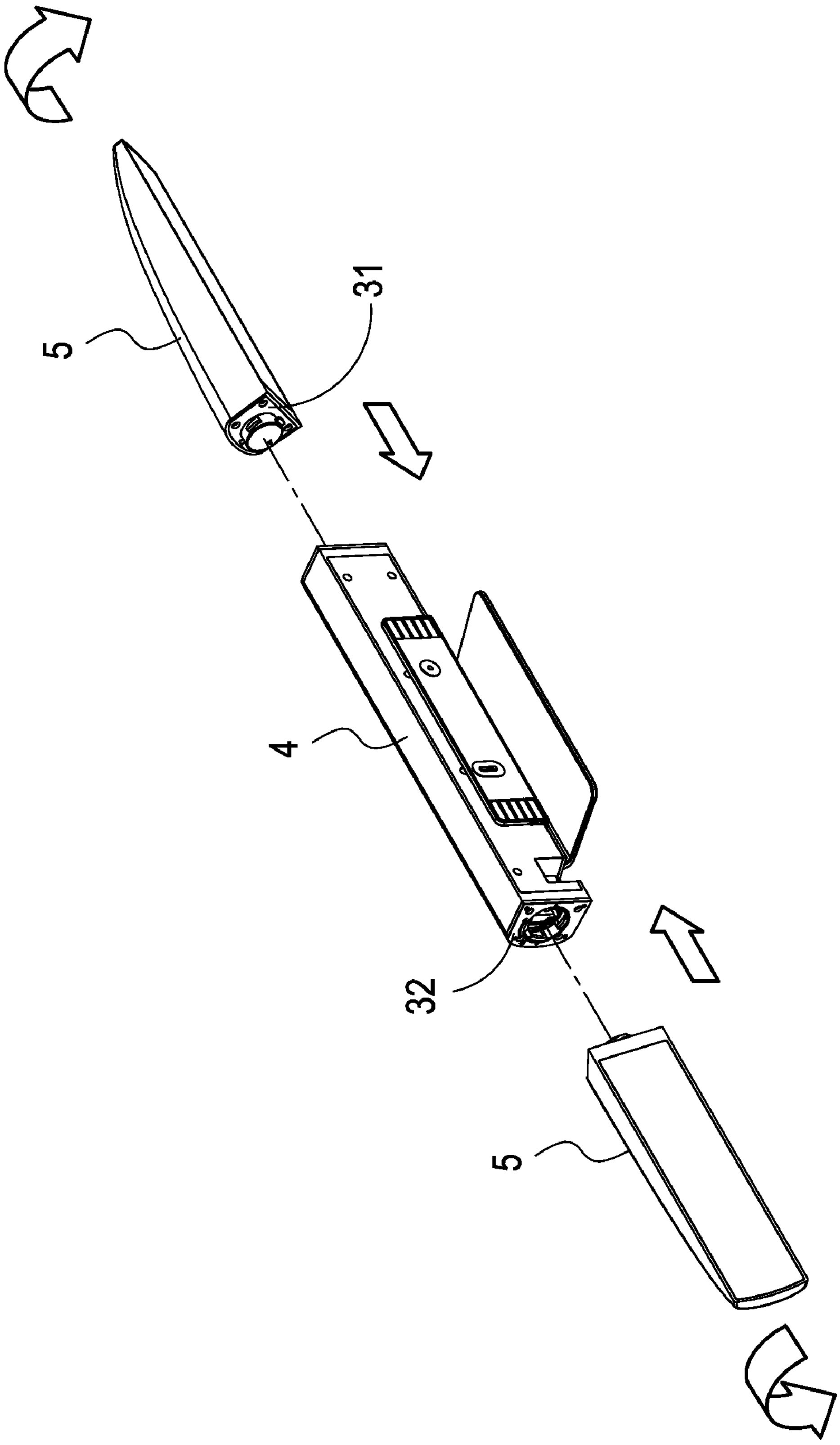
FIG. 5B illustrates a schematic assembling view of the connecting structure and the sound boxes of the present invention.
Figure 5C:
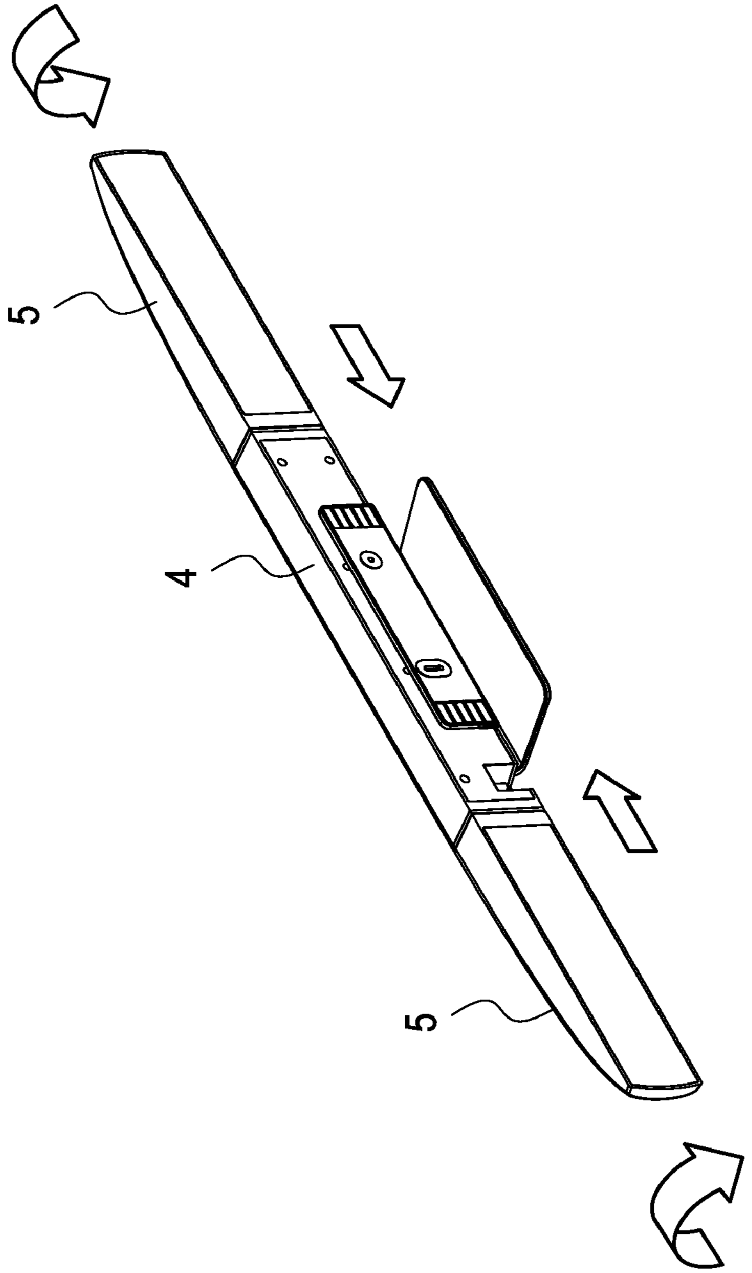
FIG. 5C illustrates another schematic assembling view of the connecting structure and the sound boxes of the present invention.

With references to FIG. 2 and FIG. 3, which illustrate a schematic structural view of the connecting structure of the present invention and a schematic application view of the connecting structure for the sound boxes of the present invention. As shown in the figures, the connecting structure 3 is adapted to connect two sound boxes that are a first sound box 4 and a second box 5, the connecting structure 3 includes:

a clasping assembly 31, which is disposed on the end of the first sound box 4, the surface of the clasping assembly 31 has a protruding portion 311, the outer rim of the protruding portion 311 has four protruding members 3111, wherein the edge of the other surface of the clasping assembly 31 has four locking holes 312 for the clasping assembly 31 being fixing to the end of the first sound box 4; and a positioning assembly 32, which is disposed on the end of the second sound box 5, the surface of positioning assembly 32 has a hollow open 321, the inner rim of the hollow open 321 has four oblique-rotation positioning portions 3211 and four apertures 3212 according to the protruding members 3111 of the clasping assembly 31, wherein the edge of the other surface of the positioning assembly 32 has four locking holes 322 for the positioning assembly 32 being fixing to the end of the second sound box 5;

wherein the protruding members 3111 of the protruding portion 311 of the clasping assembly 31 are inserted into the apertures 3212 of the hollow open 321 of the positioning assembly 32 accordingly, the clasping assembly 31 or the positioning assembly 32 being rotated in order to let the protruding members 3111 be fixed in the positioning portions 3211, so that the first sound box 4 and the second sound box 5 are connected to each other, please refer to FIG. 4, FIG. 5A, FIG. 5B, and FIG. 5C as well, which illustrate a schematic assembly view of the connecting structure and the sound boxes of the present invention, a schematic exploded view of the connecting structure and the sound boxes of the present invention, a schematic assembling view of the connecting structure and the sound boxes of the present invention, and another schematic assembling view of the connecting structure and the sound boxes of the present invention.

Preferably, the first sound box 4 accommodates a plurality of loudspeaker monomers 42.

Preferably, the surface of the end of the first sound box 4 has four concave holes 41, the clasping assembly 31 can be fixed onto the end of the first sound box 4 by way of penetrating four locking components (not shown in figure) through the locking holes 312 of the clasping assembly 31 and fixing the four locking components in the four concave holes 41.

Preferably, the second sound box 5 accommodates a plurality of loudspeaker monomers 52.

Preferably, the surface of the end of the second sound box 5 has four concave holes 51, the positioning assembly 32 can be fixed onto the end of the second sound box 5 by way of penetrating four locking components (not shown in figure) through the locking holes 322 of the positioning assembly 32 and fixing the four locking components in the four concave holes 51.

The present invention has the following advantages:

1. The connecting structure is to connect sound boxes, especially such sound boxes are with different lengths and those sound boxes can be assembled to fit a suitable length, so that LCD TVs with different dimensions can be applied.
2. Continuing above advantage, sound boxes with a uniform specification can be mass-produced and cooperate with the present invention in order to achieve that of fast assembly and dismantling and easy transportations.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A sound box assembly comprising:

a first sound box;

a second sound box;

a clasping assembly disposed on a first end of the first sound box, the clasping assembly having a surface and a protruding portion, the outer rim of the protruding portion having a plurality of protruding members, and the surface of the clasping assembly having a plurality of locking holes for the clasping assembly being fixed to the first end of the first sound box; and a positioning assembly disposed on a first end of the second sound box, the positioning assembly having a surface and a hollow open, the inner rim of the hollow open having a plurality of oblique-rotation positioning portions and a plurality of apertures according to the protruding members of the clasping assembly, and the surface of the positioning assembly having a plurality of locking holes for the positioning assembly being fixed to the first end of the second sound box;

wherein the protruding members of the protruding portion of the clasping assembly are inserted into the apertures of the hollow open of the positioning assembly accordingly, the clasping assembly or the positioning assembly being rotated in order to let the protruding members be fixed in the positioning portions, so that the first sound box and the second sound box are connected to each other.

* * * * *